July 7, 1959  B. C. ARNOLD  2,893,249
SPEEDOMETER DRIVE MEANS
Filed Oct. 23, 1956  2 Sheets-Sheet 1
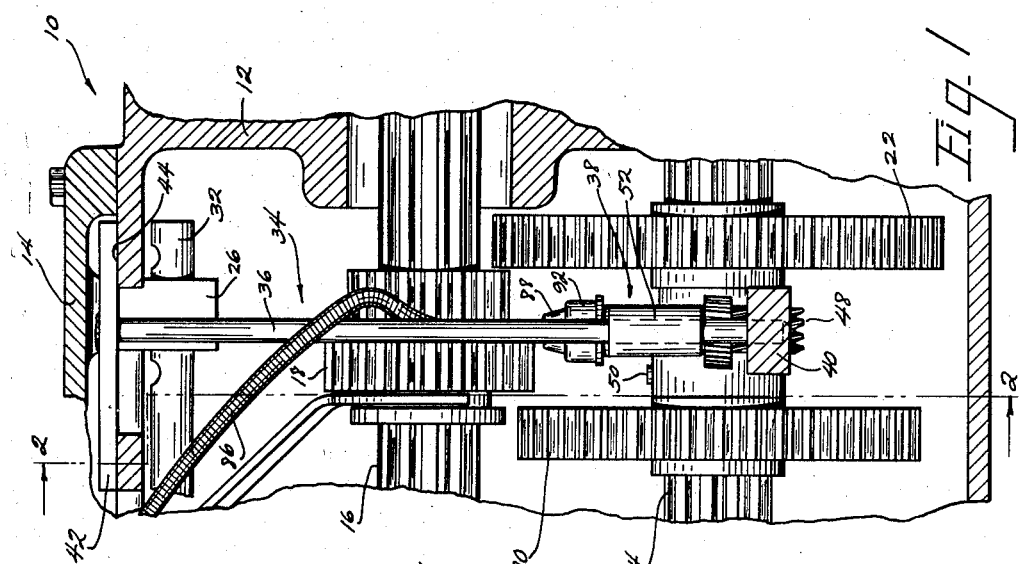
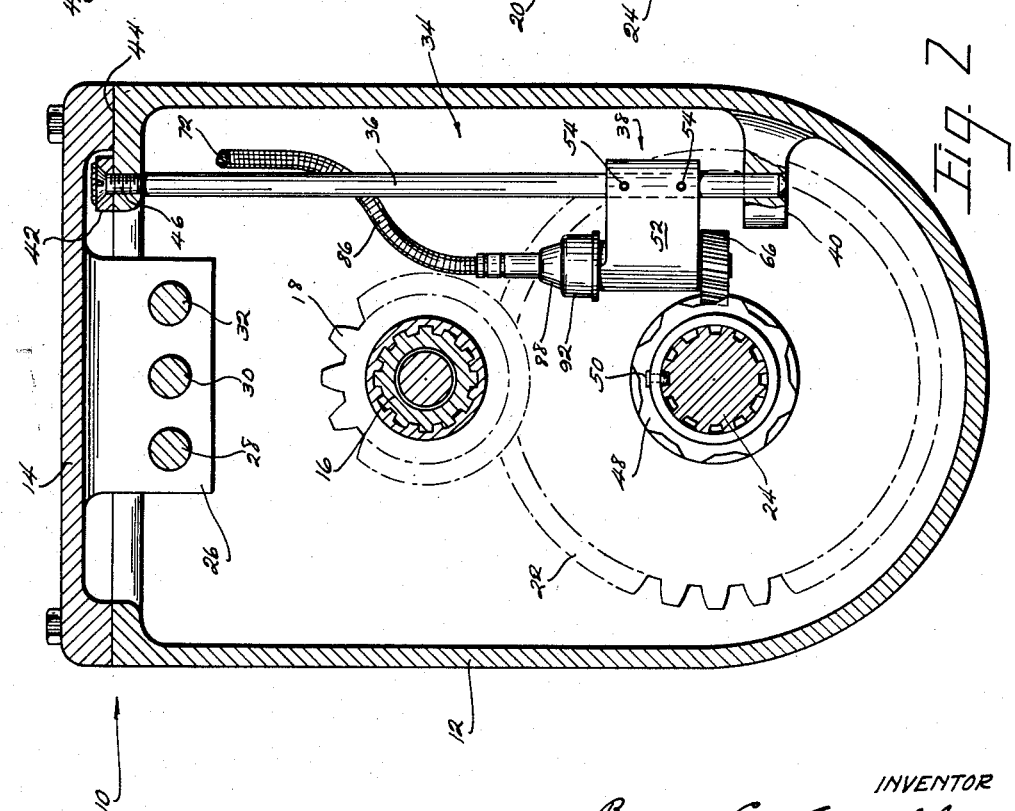
INVENTOR
Bruce C. Arnold
BY

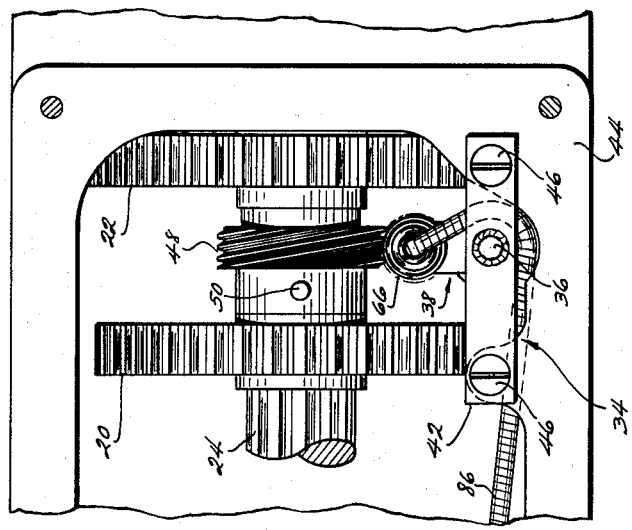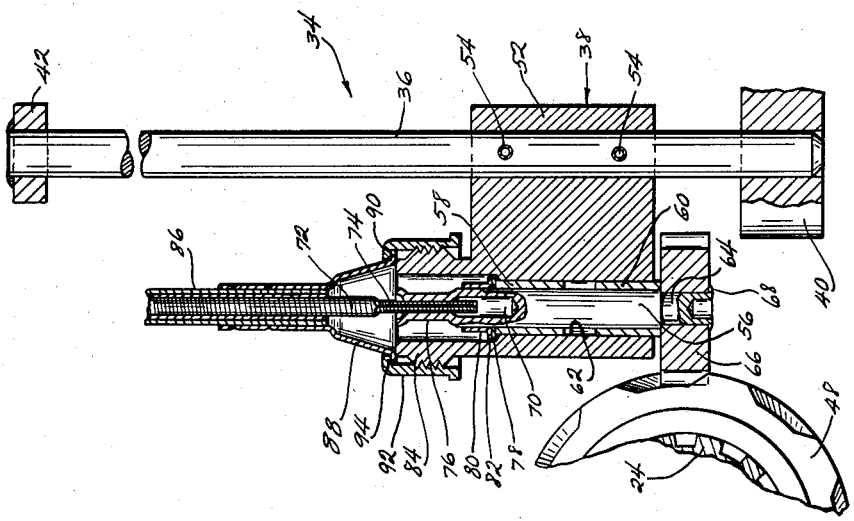

2,893,249
SPEEDOMETER DRIVE MEANS

Bruce C. Arnold, Rock Island, Ill., assignor to J. I. Case Company, Racine, Wis., a corporation of Wisconsin Application October 23, 1956, Serial No. 617,733

3 Claims. (Cl. 74—12)

This invention relates to a speedometer drive and especially to the type of drive associated with the drive shaft of a tractor or other vehicle.

The present practice is to drive the speedometer from the drive shaft either from the point where the latter extends from the transmission case or within the case proper. In both instances the servicing of the speedometer drive requires removal of mud and grease, in that access to the drive is usually located at the lower exterior portion of the transmission. Another objection to the present drive is that the cable housing is exposed to mud and water in that the cable hangs under the body of the vehicle.

An object of this invention is to provide a speedometer drive that can be conveniently serviced, and assured of adequate lubrication.

Another object is to provide a speedometer drive that can be removed and replaced as an integral unit without disturbing the proper meshing of the drive and driven gears.

Another object is to provide a speedometer drive that embraces a means of accurately positioning the driven gear relative to the drive gear.

Another object is to provide a speedometer drive that protects the drive mechanism and the cable housing from mud and water.

Further objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention.

Referring to the drawings: Fig. 1 is a vertical fragmentary side view, partly in section, of a portion of a transmission incorporating the present invention.

Fig. 2 is a vertical section taken at 2—2 of Fig. 1, and transversely of the transmission case.

Fig. 3 is a fragmentary plan view of the transmission case with the cover removed and showing the means of anchoring the upper end of the drive assembly.

Fig. 4 is a vertical, enlarged axial sectional view of the invention showing the interior construction, and showing only portions of the transmission.

Referring to the drawing, 10 is a transmission case of a tractor or similar vehicle, comprising a lower case portion 12, and a cover 14. Portion 12 encloses a shaft 16, which in this instance carries a gear 18, having two steps which mesh alternately with gears 20 and 22. Gears 20 and 22, are splined or keyed to a drive shaft 24 which is suitably journalled in lower case 12, and which shaft extends to the final drive of the vehicle. When the vehicle is being operated, either gear 20 or 22 is in mesh with gear 18 so shaft 24 will then rotate at the speed selected.

Cover 14 carries the projection 26 which provides a guide for shift rods 28, 30, and 32, which details do not concern the invention, and therefore, will not be further described.

The gist of the invention is the drive assembly 34. Assembly 34 comprises a support member 36, which in this instance is a cylindrical bar positioned vertically in case 12, and which provides the support for a drive head 38.

Lower case portion 12 in this instance is provided with an integral lug 40 in the lower portion thereof as shown in Figs. 1, 2 and 4. Lug 40 is drilled with a vertical hole to receive the lower end of support member 36 so as to locate the latter accurately in place in a horizontal direction. The upper end of support member 36 terminates in a horizontal plate 42 which is rectangular in shape, and of a suitable length as shown in Figs. 1, 2 and 4. Plate 42 is drilled to receive support member 36, which extends through the hole. Member 36 and plate 42 are then welded together as shown in Figs. 1 through 4.

The upper flange 44 of case 12 is machined so as to provide a seat for cover 14, and also a seat for plate 42. Flat-head screws 46 are passed through suitable countersunk holes in plate 42 and then into threaded holes of flange 44. A helical type of drive gear 48 is placed on shaft 24 intermediate gears 20 and 22 as shown in Figs. 1 and 2. Gear 48 is provided with a rivet pin 50 which is secured in the hub of the gear and engages one of the spline grooves of shaft 24. Pin 50 comprises the sole means of positively driving gear 48 and which means is considered adequate in that only a small amount of power is transmitted by gear 48.

Drive head 38 comprises a bracket portion 52 having a bore therethrough to receive member 36. A pair of pins 54 of either the tapered or straight type are driven into holes passing through bracket 52 and member 36 so as to secure the bracket 52 axially on the support member 36.

Head 38 is provided with a shaft 56 having an axis parallel to member 36 and journalled in bushings 58 and 60 which are pressed into a bore 62 of bracket 52. Shaft 56 is provided with a portion of reduced diameter 64 on which a driven gear 66 is placed, the latter being in mesh with gear 48. Gear 66 is secured integrally with shaft 56 by staking the end of the shaft at 68 as shown in Fig. 4.

The upper end of shaft 56 is drilled axially as at 70, to provide freedom for axial movement of a conventional flexible shaft 72 having a square driving portion 74. Shaft 56 is formed inwardly towards its axis as at 76 and shown in Fig. 4, so as to provide a central hole of square cross section to accommodate the corresponding square portion 74 of shaft 72 for the purpose of providing a positive drive for the latter.

A thrust washer 78 is placed on shaft 56 in contact with the end of bushing 58, and a collar 80 having a flange 82 is pressed integrally on shaft 56 so as to prevent axial displacement of shaft 56. Bracket 52 is provided at the upper end thereof with an externally threaded boss 84. A flexible housing 86 encloses shaft 72 and terminates in a bell-shaped portion 88, having a flange 90 in contact with the end of boss 84. A threaded sleeve 92 having a flange 94, secures bell-shaped portion 88 in contact with the end of boss 84 thereby maintaining the end 74 of shaft 72 in driving engagement with the square portion of shaft 56.

It will be clear that the applicant has provided a convenient means of mounting a speedometer drive having the components thereof located entirely within the transmission case where the drive is protected from dirt and moisture, and assured of adequate lubrication. Housing 86 and shaft 72 are of a length to conveniently reach to the speedometer which is usually located on an instrument panel convenient to the operator.

Removal and replacement of the complete unit can be effected by merely removing the cover 14 and screws 46. Drive assembly 34 can then be lifted vertically to insert a new assembly. It is merely necessary to place support member 36 in the hole in lug 40, and replace screws 48. Gears 46 and 66 will then be in proper mesh with each other without special attention being paid to the position of the assembly in that the latter will be automatically located.

The above being a complete description of an illustrative embodiment of the invention, what is claimed as new and desired to be secured by Letters Patent of the United States is:

1. In a tractor having a transmission case and a drive shaft extending horizontally therethrough, and having a drive gear fixed to said shaft, in combination, a speedometer drive comprising an elongated support member disposed vertically in said case adjacent said drive gear, a lower lug portion within said case and integral therewith and provided with an aperture to slidingly receive said support member, upper lug portions spaced vertically from said lower lug portion, integral with said case and having horizontal surfaces, a bracket secured integrally to the upper end of said support member and normal thereto, and threaded means to secure said bracket to said upper lug portions, a drive head fixed to said support member adjacent said drive gear, a driven shaft journalled in said head, a driven gear fixed on said driven shaft and so positioned as to engage said drive gear, and a flexible shaft keyed to said driven shaft.

2. In a tractor having a transmission case and a drive shaft extending horizontally therethrough, and having a drive gear fixed to said shaft, in combination, a speedometer drive comprising an elongated support member disposed vertically in said case, a lower lug portion within said case and integral therewith and provided with an aperture to receive said support member, upper lug portions integral with said case and having horizontal surfaces, a bracket secured integrally to the upper end of said support member and normal thereto, and threaded means to secure said bracket to said upper lug portions, a drive head fixed to said support member adjacent said drive gear, a driven shaft journalled in said head, a driven gear fixed on said driven shaft and so positioned so as to engage said drive gear, and a flexible shaft in driving relation with said driven shaft.

3. In a transmission having a case and a drive shaft extending therethrough, and a drive gear fixed to said shaft, in combination, a speedometer drive comprising an elongated support member disposed in said case and having the axis thereof normal to the axis of said shaft, a lower lug portion within said case and integral therewith and having an aperture to receive said support member, an upper lug portion integral with said case, a bracket secured integrally to the upper end of said support member and normal thereto, and means to secure said bracket to said upper lug portion to prevent rotation of said support member about the axis thereof, a drive head fixed to said support member adjacent said drive gear, a driven shaft journalled in said head, a driven gear fixed on said driven shaft so as to engage said drive gear, and a flexible shaft in driving engagement with said driven shaft.

References Cited in the file of this patent
UNITED STATES PATENTS

| | | |
|---|---|---|
| 1,644,888 | McIntyre | Oct. 11, 1927 |
| 1,648,489 | Lundgren | Nov. 8, 1927 |
| 2,329,683 | Vaughan | Sept. 14, 1943 |